US006945566B2

(12) United States Patent
Weiss

(10) Patent No.: US 6,945,566 B2
(45) Date of Patent: Sep. 20, 2005

(54) HIGH-PRESSURE CONNECTION DEVICE

(75) Inventor: Gerhard Weiss, Neuhofen/Krems (AT)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 10/333,716

(22) PCT Filed: Mar. 23, 2002

(86) PCT No.: PCT/DE02/01079

§ 371 (c)(1),
(2), (4) Date: Sep. 29, 2003

(87) PCT Pub. No.: WO02/095216

PCT Pub. Date: Nov. 28, 2002

(65) Prior Publication Data

US 2004/0051306 A1 Mar. 18, 2004

(30) Foreign Application Priority Data

May 25, 2001 (DE) ........................................ 101 25 439

(51) Int. Cl.[7] ................................................ F16L 35/00

(52) U.S. Cl. .................... 285/92; 285/148.27; 285/219; 411/308; 411/300

(58) Field of Search ........................ 285/92, 219, 143.1, 285/353, 220, 148.27, 337; 411/300, 315, 308, 282, 414, 366.3

(56) References Cited

U.S. PATENT DOCUMENTS

| | | | | | |
|---|---|---|---|---|---|
| 181,166 | A | * | 8/1876 | Haldeman et al. | 411/315 |
| 383,366 | A | * | 5/1888 | Neiman et al. | 411/300 |
| 473,818 | A | * | 4/1892 | Binns | 403/343 |
| 769,717 | A | * | 9/1904 | Ryan | 411/276 |
| 786,516 | A | * | 4/1905 | Phelan | 285/148.23 |
| 1,870,380 | A | * | 8/1932 | Peters et al. | 411/308 |
| 2,545,927 | A | * | 3/1951 | Lockwood | 411/300 |
| 2,631,357 | A | * | 3/1953 | Gobel | 407/39 |
| 2,937,891 | A | * | 5/1960 | Gressel | 285/148.23 |
| 3,385,613 | A | * | 5/1968 | McCall | 285/84 |
| 3,695,642 | A | * | 10/1972 | DeWoody | 285/148.3 |
| 4,576,402 | A | * | 3/1986 | Murray et al. | 285/39 |
| 4,601,491 | A | * | 7/1986 | Bell et al. | 285/24 |
| 4,938,624 | A | * | 7/1990 | Johnson et al. | 403/195 |
| 5,033,435 | A | | 7/1991 | Lingl et al. | |
| 5,172,939 | A | | 12/1992 | Hashimoto | |
| 5,577,872 | A | * | 11/1996 | Nakamura | 411/432 |
| 5,918,911 | A | * | 7/1999 | Sims | 285/13 |
| 5,931,511 | A | | 8/1999 | Buster et al. | |
| 5,951,060 | A | * | 9/1999 | Fukano et al. | 285/92 |
| 6,112,396 | A | * | 9/2000 | Steinbock | 29/452 |
| 6,199,539 | B1 | | 3/2001 | Ikac et al. | |
| 6,318,339 | B1 | * | 11/2001 | Hofmann | 123/469 |
| 6,485,061 | B1 | * | 11/2002 | Mosing et al. | 285/93 |
| 6,712,295 | B2 | * | 3/2004 | Frank | 239/533.2 |
| 2003/0160450 | A1 | * | 8/2003 | Kozak | 285/353 |

FOREIGN PATENT DOCUMENTS

| | | | |
|---|---|---|---|
| DE | 197 53 518 | A | 6/1999 |
| DE | 199 36 535 | A | 2/2001 |
| GB | 2021720 | A | 12/1979 |

* cited by examiner

*Primary Examiner*—Eric K. Nicholson
(74) *Attorney, Agent, or Firm*—Ronald E. Greigg

(57) ABSTRACT

A high-pressure connection device with a housing having a receiving opening into which an inlet conduit discharges. A pressure tube connector stub discharges on one end into an end face of the connector stub and has a male thread, which engages a female thread in the receiving opening press a sealing face on the connector stub into the receiving opening into contact with a seat face of the receiving opening. Both threads are embodied as sawtooth threads, and the thread flanks, which are embodied at least approximately perpendicular to the longitudinal axis of the female thread, rest on one another with nonpositive engagement in the tensed state.

15 Claims, 2 Drawing Sheets

HIGH-PRESSURE CONNECTION DEVICE

CROSS-REFERENCE TO RELATED APPLICATIONS

This application is a 35 USC 371 application of PCT/DE 02/01079 filed on Mar. 23, 2002.

BACKGROUND OF THE INVENTION

1. Field of the Invention

The invention is directed to an improved high-pressure connection device for delivering fluid such as fuel to a device, for example a fuel injector.

2. Description of the Prior Art

One high-pressure connection device, known from Published, Nonexamined German Patent Application DE 197 53 518 A1, for instance, serves to deliver a fluid, preferably fuel, to an apparatus. Such a high-pressure connection device has a housing in which a receiving opening is embodied. Discharging into this receiving opening is an inlet conduit, which extends in the housing and through which the fluid can be conducted at high pressure. The high-pressure connection device furthermore contains a pressure tube connector stub with a high-pressure conduit embodied in it, through which the fluid can likewise be conducted at high pressure. The high-pressure conduit discharges at an end face of the pressure tube connector stub and communicates sealingly with the inlet conduit extending in the housing once the pressure tube connector stub is screwed, with a male thread embodied on it, into a female thread embodied in the receiving opening. The pressure tube connector stub, on its end face, has a sealing face, which when the pressure tube connector stub is screwed in is tensed against a seat face embodied in the receiving opening, so that the inlet conduit in the housing is made to communicate sealingly with the high-pressure conduit in the pressure tube connector stub.

The male thread on the pressure tube connector stub and the female thread in the receiving opening of the housing are typically embodied as 60° standard threads. This means that both flanks of the thread courses form an angle of at least approximately 60° with the longitudinal axis of the thread, so that between the two thread flanks as well, an angle of 60° is enclosed. If external or other factors result in a lateral force on the pressure tube connector stub, then the thread flanks of the female thread and the male thread become slightly shifted from one another. As a result, the pressure tube connector stub is somewhat skewed from its original axis, because the lateral flanks of the male thread on the pressure tube connector stub that receive the tensing force slide along the thread flanks of the female thread and thus also deviate in the axial direction. Since the sealing face of the pressure tube connector stub surrounds the orifice of the high-pressure conduit, the pressure per unit of surface area of the sealing face on the seat face decreases on the side where the lateral force engages the pressure tube connector stub. This can create leaks, since a more or less high pressure prevails in the high-pressure conduit and in the inlet conduit.

SUMMARY AND ADVANTAGES OF THE INVENTION

The high-pressure connection device of the invention has the advantage over the prior art that a uniform pressure per unit of surface area at the sealing face of the pressure tube connector stub when it is in contact with the seat face of the housing is preserved even when lateral force is exerted on the pressure tube connector stub. As a result, leaks at the sealing face are avoided, without requiring any higher contact pressure than is needed for a 60° thread at the sealing face. The female thread and the male thread are each embodied as a so-called sawtooth thread, in which the thread flanks that receive force are at least approximately perpendicular to the longitudinal axis of the thread. If a lateral force is exerted on the pressure tube connector stub, then these thread flanks are shifted somewhat relative to one another, but this does not lead to any decrease in the contact pressure at the sealing face of the pressure tube connector stub, since the pressure tube connector stub is shifted parallel, and thus the contact pressure does not decrease in any part of the sealing face.

In an advantageous feature of the subject of the invention, a securing bore is embodied in the high-pressure connection device and at least partly penetrates both the female thread and the male thread and in which a securing element by which the screwed-in pressure tube connector stub is prevented from coming loose is disposed. Preferably, the securing element is a cylindrical pin, which can be produced especially simply and inexpensively. This means of securing against relative rotation is embodied as close as possible to the sealing face of the pressure tube connector stub, since it is there that the securing is most effective. If a loosening torque on the pressure tube connector stub occurs, a lateral transverse force acts on the securing element, which shifts the pressure tube connector stub laterally somewhat in the receiving opening of the housing. The perpendicular thread flanks of the sawtooth thread, however, assure that as described above, the contact pressure on the sealing face remains constant, and no leaks occur at the sealing face.

In a further advantageous feature, the securing bore is embodied in the tangential direction relative to the longitudinal axis of the female thread. This is a simple disposition of the securing bore and it causes only a minimal reduction in the wall thickness of the high-pressure conduit embodied in the pressure tube connector stub.

In a further advantageous feature, the securing bore extends in the radial direction relative to the longitudinal axis of the female thread. A securing bore of this kind is advantageous whenever accessibility at the housing of the high-pressure connection device is difficult and only little space is available.

BRIEF DESCRIPTION OF THE DRAWINGS

Further advantages and advantageous features of the invention can be learned from the description contained herein below, taken with the drawings, in which.

DESCRIPTION OF THE PREFERRED EMBODIMENTS

Figure 1:
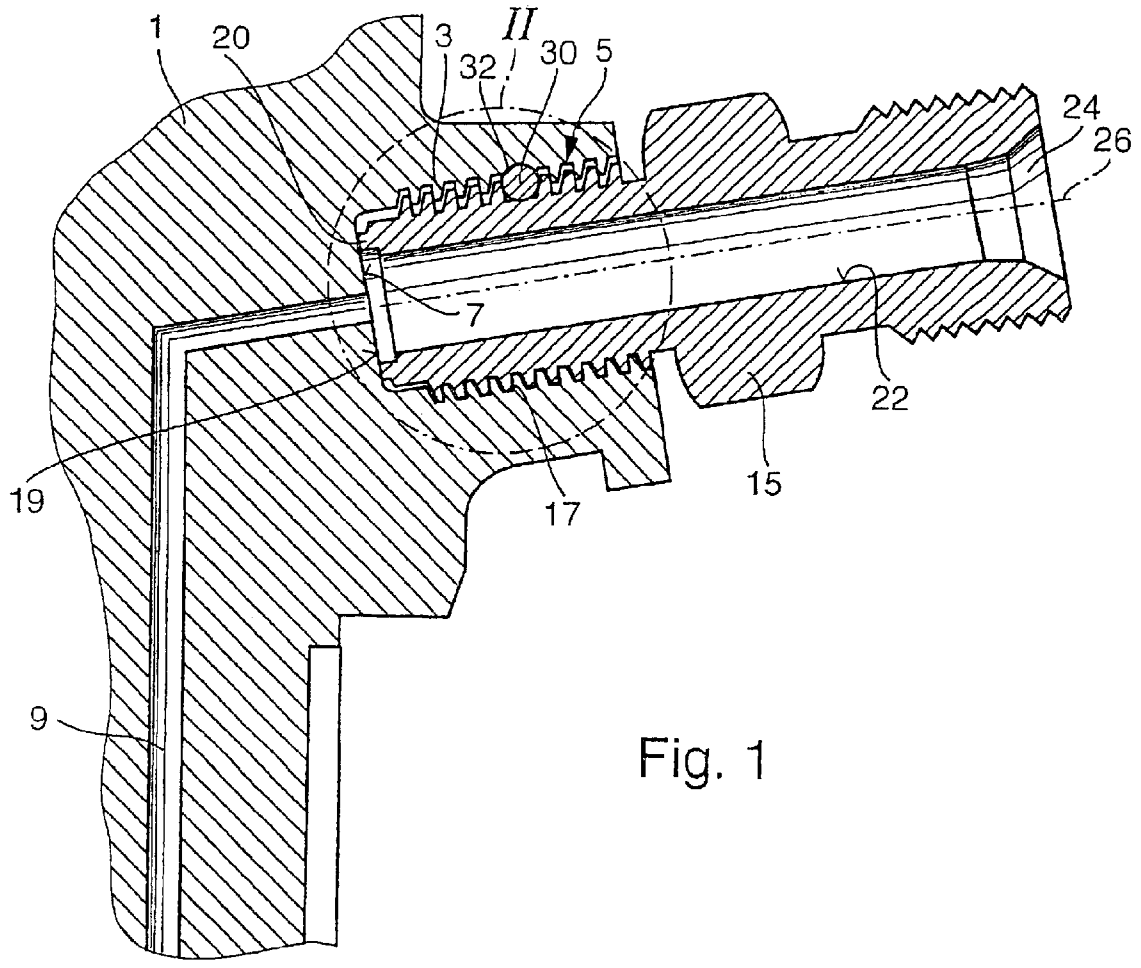
FIG. 1 is a longitudinal section through a high-pressure connection device.

In FIG. 1, one exemplary embodiment of the high-pressure connection device of the invention is shown. A housing 1 has a receiving opening 3, into which an inlet conduit 9 extending in the housing 1 discharges. The housing 1 here is preferably part of a fuel injection valve for internal combustion engines, of the kind used to inject fuel into combustion chambers of internal combustion engines.

The receiving opening 3 is embodied cylindrically, and the bottom face of the receiving opening 3 is embodied as a seat face 7. The inlet conduit 9 in the housing 1 discharges centrally into the seat face 7, so that the latter has the shape of an annular disk. A female thread 5 is embodied on the outer jacket face of the receiving opening 3; it is shaped as a sawtooth thread and has a longitudinal axis 26. A pressure tube connector stub 15 is screwed into the receiving opening 3; in its end region toward the receiving opening 3, it is embodied as at least approximately cylindrically, and in this region it has a male thread 17, which engages the female thread 5 of the receiving opening 3. The male thread 17 here is also embodied as a sawtooth thread. The pressure tube connector stub 15 has an open high-pressure conduit 22, which connects a high-pressure connection 24, located in one end region of the pressure tube connector stub 15, with the face end 19, toward the housing 1, of the pressure tube connector stub. The high-pressure connection 24 communicates with a high-pressure fuel source, for instance.

Figure 2:
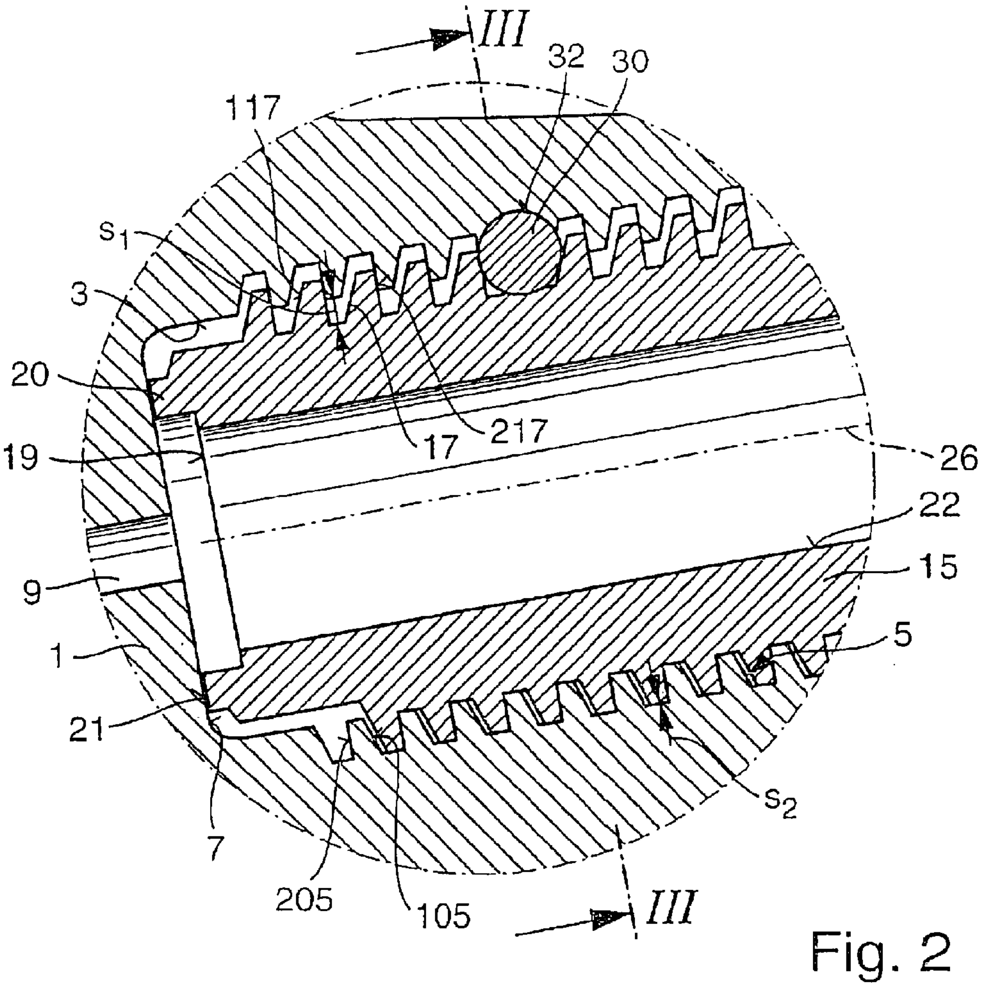
FIG. 2 is an enlargement of FIG. 1 in the region marked II.

FIG. 2 shows an enlargement in the end region, toward the housing 1, of the pressure tube connector stub 15. An annular rib 20 is embodied on the face end 19 of the pressure tube connector stub 15, extending all the way around and surrounding the orifice of the high-pressure conduit 22 at the end face 19. A sealing face 21 is embodied on the annular rib 20 and comes to rest, when the pressure tube connector stub 15 is screwed in, on the seat face 7 of the receiving opening 3. As a result of the tension of screwing in the pressure tube connector stub, the sealing face 21 presses into the seat face 7, so that the high-pressure conduit 22 is made to communicate sealingly with the inlet conduit 9.

In the housing 1 and in the pressure tube connector stub 15, a securing bore 32 is embodied that penetrates both the female thread 5 and the male thread 17 and that extends perpendicular to and is laterally offset from the longitudinal axis 26 of the female thread 5 and of the male thread 17. The tangential securing bore 32 disposed in this way receives a securing pin 30, which is embodied cylindrically and is fitted by positive engagement into the securing bore 32. By means of the securing pin 30, the screwed-in pressure tube connector stub 15 is secured against coming loose, since the securing pin 30 blocks a rotational motion of the pressure tube connector stub 15 relative to the housing 1. In order to secure the pressure tube connector stub 15 with the desired tightening moment, the pressure tube connector stub 15 is screwed into the receiving opening 3 before the securing bore 32 is made. Once the pressure tube connector stub 15 has been screwed into the receiving opening 3 and the desired tightening moment has been reached, which happens when a suitable contact pressure exists at the sealing face 21, the securing bore 32 is made, and a securing pin 30 is introduced into the securing bore 32. This creates a means of securing against coming loose that is disposed close to the sealing face 21 and thus to the seat face 7, so that between the means that secures against loosening and the sealing face 21, no significant deformation of the pressure tube connector stub 15, which could cause leaks at the sealing face 21, can occur.

As already noted, the female thread 5 is embodied as a sawtooth thread. To that end, the female thread 5 has an oblique thread flank 105 and an opposed thread flank 205, which extends at least approximately perpendicular to the longitudinal axis 26 of the female thread 5. The perpendicular thread flank 205 faces toward the seat face 7 of the receiving opening 3. The transition between the oblique thread flank 105 and the perpendicular thread flank 205 is chamfered, in order to avoid notch stresses.

The male thread 17 embodied on the pressure tube connector stub 15 is also embodied as a sawtooth thread and fits precisely into the female thread 5. The male thread 17 also has one oblique thread flank 117 and one perpendicular thread flank 217, and the perpendicular thread flank 217 of the male thread 17 faces away from the seat face 7. In the process of screwing the pressure tube connector stub 15 into the receiving opening 3, the perpendicular thread flank 205 of the female thread 5 and the perpendicular thread flank 217 of the male thread 17 come into contact with one another with a positive engagement.

Figure 3:
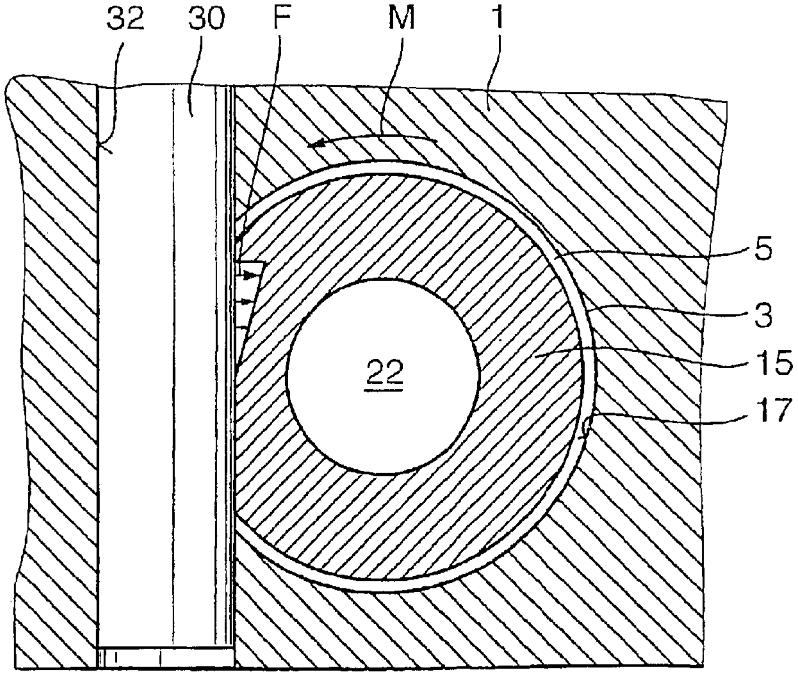
FIG. 3 is a cross section through FIG. 2 taken along the line III—III.

The action of a loosening moment M on the pressure tube connector stub 15 is shown in FIG. 3; FIG. 3 is a cross section through FIG. 2, taken along the line III—III. As a result of the torque M, represented in FIG. 3 by an arrow, a force F is exerted on the pressure tube connector stub 15 as a result of the contact of the pressure tube connector stub 15 with the securing element 30; relative to the axial extent of the securing element 30, this force has the course shown in FIG. 3. The transverse force on the pressure tube connector stub 15 has the effect of moving the pressure tube connector stub 15 away from the securing pin in the region of the securing pin 30, and as a result, the perpendicular thread flanks 205 and 217 of the female thread 5 and male thread 17, respectively, engage each in an off centered relationship. This increases the gap size $S_1$, as shown in FIG. 2. Precisely the opposite conditions occur on the diametrically opposite side of the pressure tube connector stub 15, since there the pressure tube connector stub 15 is moved closer to the wall of the receiving opening 3. Once again, the perpendicular thread flanks 205 and 217 are not centered with respect to each other by a slight amount, so that on this side of the pressure tube connector stub 15 the gap size $S_2$ results, which is smaller than $S_1$. As a result of this parallel shifting of the pressure tube connector stub 15, the sealing face 21 on the seat face 7 also shifts, but the contact pressure on the sealing face 21 remains constant over the entire circumference of the annular part 20. The result, even at a correspondingly high fuel pressure in the high-pressure conduit 22 and in the inlet conduit 9, is secure sealing at the sealing face 21, even if a loosening moment is exerted on the pressure tube connector stub 15.

A high-pressure connection device of this kind can advantageously be embodied on a fuel injection valve of the kind used to inject fuel into the combustion chamber of internal combustion engines with either self-ignition or externally supplied ignition. In that case, the housing 1 is part of a fuel injection valve, and the pressure tube connector stub 15 communicates at its high-pressure connection 24 with a high-pressure fuel source. In this case, the fuel flows through the pressure tube connector stub 15 and onward through the inlet conduit 9 to an injection nozzle. However, the high-pressure connection device of the invention can also be embodied in any other part of a high-pressure fuel system in which fuel at high pressure is to be brought out of a line into a housing. Instead of fuel, any other fluid can also be carried through such a high-pressure connection device.

The foregoing relates to preferred exemplary embodiments of the invention, it being understood that other variants and embodiments thereof are possible within the spirit and scope of the invention, the latter being defined by the appended claims.

I claim:

1. In a high-pressure connection device, comprising a housing (1) in which a receiving opening (3) is present, into which opening an inlet conduit (9) extending in the housing (1) discharges, a pressure tube connector stub (15), in which a high-pressure conduit (22) is embodied that discharges at one end into an end face (19) of the pressure tube connector stub (15), a male thread (17), embodied on the pressure tube connector stub (15), which thread engages a female thread (5), embodied in the receiving opening (3) and having a longitudinal axis (26), so that when the pressure tube connector stub (15) is screwed into the receiving opening (3) it comes to rest, with a sealing face (21) embodied on the end face (19), on a seat face (7) of the receiving opening (3), the improvement wherein both threads (5; 17) are embodied as sawtooth threads having thread flanks (205; 217), which are embodied at least approximately perpendicular to the longitudinal axis (26) of the female thread (5), and which engage each other in a slightly off centered relationship while in a tensed state.

2. The high-pressure connection device of claim 1, further comprises a securing bore (32) embodied in the housing (1) and which at least partly penetrates both the female thread (5) and the male thread (17), and a securing element (30) disposed in the securing bore (32) by which the screwed-in pressure tube connector stub (15) is prevented from coming loose.

3. The high-pressure connection device of claim 2, wherein the securing element (30) is a cylindrical pin.

4. The high-pressure connection device of claim 2, wherein the securing bore (32) extends in the tangential direction relative to the longitudinal axis (26) of the female thread (5).

5. The high-pressure connection device of claim 2, wherein the securing bore (32) extends in the radial direction relative to the longitudinal axis (26) of the female thread (5).

6. The high-pressure connection device of claim 1, wherein the housing (1) is part of a fuel injection valve for internal combustion engines.

7. The high-pressure connection device of claim 2, wherein the housing (1) is part of a fuel injection valve for internal combustion engines.

8. The high-pressure connection device of claim 3, wherein the housing (1) is part of a fuel injection valve for internal combustion engines.

9. The high-pressure connection device of claim 4, wherein the housing (1) is part of a fuel injection valve for internal combustion engines.

10. The high-pressure connection device of claim 5, wherein the housing (1) is part of a fuel injection valve for internal combustion engines.

11. The high-pressure connection device of claim 6, wherein the high-pressure conduit (22) in the pressure tube connector stub (15) communicates on one end with a high-pressure fuel source.

12. The high-pressure connection device of claim 7, wherein the high-pressure conduit (22) in the pressure tube connector stub (15) communicates on one end with a high-pressure fuel source.

13. The high-pressure connection device of claim 8, wherein the high-pressure conduit (22) in the pressure tube connector stub (15) communicates on one end with a high-pressure fuel source.

14. The high-pressure connection device of claim 9, wherein the high-pressure conduit (22) in the pressure tube connector stub (15) communicates on one end with a high-pressure fuel source.

15. The high-pressure connection device of claim 10, wherein the high-pressure conduit (22) in the pressure tube connector stub (15) communicates on one end with a high-pressure fuel source.

* * * * *